(12) United States Patent
Nammoto

(10) Patent No.: US 7,974,412 B2
(45) Date of Patent: Jul. 5, 2011

(54) COMMUNICATION SYSTEM, TRANSMISSION DEVICE, RECEPTION DEVICE, AND COMMUNICATION SCHEME

(75) Inventor: Takashi Nammoto, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 694 days.

(21) Appl. No.: 12/053,956

(22) Filed: Mar. 24, 2008

(65) Prior Publication Data

US 2008/0310632 A1 Dec. 18, 2008

(30) Foreign Application Priority Data

Mar. 30, 2007 (JP) .................................. 2007-090145
Feb. 6, 2008 (JP) .................................. 2008-026687

(51) Int. Cl.
*H04K 1/00* (2006.01)
*H04L 9/32* (2006.01)
(52) U.S. Cl. ........................................ 380/255; 380/270
(58) Field of Classification Search .................. 380/270, 380/277, 262, 44, 255; 713/174, 189, 193–194; 726/26
See application file for complete search history.

(56) References Cited

U.S. PATENT DOCUMENTS

| 4,642,424 A | * | 2/1987 | McNair | 380/262 |
| 7,079,655 B1 | * | 7/2006 | Tochikubo et al. | 380/281 |
| 7,263,277 B2 | * | 8/2007 | Kim | 386/247 |

FOREIGN PATENT DOCUMENTS

JP A-06-046041 2/1994

* cited by examiner

*Primary Examiner* — Hosuk Song
(74) *Attorney, Agent, or Firm* — Oliff & Berridge, PLC

(57) ABSTRACT

A communication system includes a transmission device that transmits an information signal having information defined as a binary state value, the transmission device including a signal generation unit that generates an information decryption signal to transmit the information decryption signal together with the information signal, wherein the state value of the information decryption signal is unchanged when the state value of the information signal is changed, whereas the state value of the information decryption signal is changed when the state value of the information signal is unchanged; and a reception device that receives the information signal and the information decryption signal, the reception device including an information acquisition unit that acquires the state value of the information signal based on a changing timing of the state value of each of the information signal and the information decryption signal received.

10 Claims, 5 Drawing Sheets

COMMUNICATION SYSTEM, TRANSMISSION DEVICE, RECEPTION DEVICE, AND COMMUNICATION SCHEME

The entire disclosure of Japanese Patent Application Nos: 2007-090145, filed Mar. 30, 2007 and 2008-026687, filed Feb. 6, 2008 are expressly incorporated by reference herein.

BACKGROUND

1. Technical Field

The present invention relates to a communication system, a transmission device, a reception device, and a communication scheme.

2. Related Art

JP-A-1994-46041 discloses an example of a clock synchronous communication system. In the system, a transmission-side device determines the level of a data signal by the time of a leading or trailing edge of a clock signal, and a reception-side device acquires the data signal level in sync with the leading or trailing edge of the clock signal to perform a processing of the acquired data signal, such as a serial-to-parallel conversion, so as to decode the signal.

In the conventional system, however, a third party can easily distinguish between the data signal and the clock signal, which makes it possible to decode the data signal by using the same processing as in the reception-side device. This causes security problems such as information leaks.

SUMMARY

The present invention has been accomplished under the above circumstance. An advantage of the invention is to provide a communication system, a transmission device, a reception device, and a communication scheme, so as to improve security upon the transmission of an information signal such as a data signal.

A communication system according to a first aspect of the invention includes a transmission device that transmits an information signal having information defined as a binary state value, the transmission device including a signal generation unit that generates an information decryption signal to transmit the information decryption signal together with the information signal, wherein the state value of the information decryption signal is unchanged when the state value of the information signal is changed, whereas the state value of the information decryption signal is changed when the state value of the information signal is unchanged; and a reception device that receives the information signal and the information decryption signal, the reception device including an information acquisition unit that acquires the state value of the information signal based on a changing timing of the state value of each of the information signal and the information decryption signal received.

In the communication system of the first aspect, it is difficult to distinguish between the information signal and the information decryption signal, as well as to identify the role of each of the signals. Even if a third party reads both signals, it cannot decode the signals, thereby preventing information leaks. As a result, security can be improved in the communications of information signals such as data signals.

A communication system according to a second aspect of the invention includes a transmission device that transmits a plurality of information signals each having information defined as a binary state value, the transmission device including a signal generation unit that generates an information decryption signal to transmit the information decryption signal together with the information signals, wherein the state value of the information decryption signal is changed when the state values of the information signals are unchanged at the same timing; and a reception device that receives the information signals and the information decryption signal, the reception device including an information acquisition unit that acquires each state value of the information signals based on a changing timing of the state value of each of the information signals and the information decryption signal received.

In the communication system having the above structure, information leaks can be prevented in the transmission of the multiple information signals by the transmission device. Consequently, security can be improved in the transmission of the information signals.

Preferably, the information acquisition unit includes a first pulse generation circuit that generates a first pulse signal in sync with the change of the state value of the information signal, a second pulse generation circuit that generates a second pulse signal in sync with the change of the state value of the information decryption signal, a OR circuit that outputs a OR signal of the first and the second pulse signals, a first delay circuit that delays the OR signal by a predetermined time, a coincidence detection circuit that counts a value in sync with the OR signal delayed by the first delay circuit to output a coincidence detection signal when the counted value is coincident with the number of bits of a single information element contained in the information signal, a serial-to-parallel conversion circuit that receives the information signal and the OR signal delayed by the first delay circuit to perform a serial-to-parallel conversion of the information signal in sync with the OR signal, and a signal processing circuit that acquires the serial-to-parallel converted information signal in sync with the coincidence detection signal.

Employing the structure above allows the reception device to acquire (decode) an information signal in a simple circuit structure. This can contribute to cost reduction, improvement of design work efficiency, and design period reduction in the reception device.

Additionally, in the communication system of the second aspect in which the transmission device transmits the plurality of information signals, preferably, the information acquisition unit includes a plurality of first pulse generation circuits that are provided to correspond to each of the information signals and that generate a first pulse signal in sync with the change of the state value of each corresponding information signal, a second pulse generation circuit that generates a second pulse signal in sync with the change of the state value of the information decryption signal, a OR circuit that outputs a OR signal of the first pulse signal corresponding to each information signal and the second pulse signal, a first delay circuit that delays the OR signal by a predetermined time, a coincidence detection circuit that counts a value in sync with the OR signal delayed by the first delay circuit to output a coincidence detection signal when the counted value is coincident with the number of bits of a single information element contained in each of the information signals, a plurality of serial-to-parallel conversion circuits that are provided to correspond to each of the information signals and that each receive each corresponding information signal and the OR signal delayed by the first delay circuit to perform a serial-to-parallel conversion of the each corresponding information signal in sync with the OR signal, and a signal processing circuit that acquires each of the serial-to-parallel converted information signals in sync with the coincidence detection signal.

Employing the above structure can improve security when the transmission device transmits the plurality of information signals, as well as enables cost reduction, improvement of designing work efficiency, and design period reduction in the reception device.

In the communication system of the first aspect, preferably, the first pulse generation circuit includes a second delay circuit that delays the information signal by a predetermined time and a first exclusive OR circuit that outputs, as the first pulse signal, an exclusive OR signal of the information signal and the information signal delayed by the second delay circuit; the second pulse generation circuit includes a third delay circuit that delays the information decryption circuit by a predetermined time and a second exclusive OR circuit that outputs, as the second pulse signal, an exclusive OR signal of the information decryption signal and the information decryption signal delayed by the third delay circuit; and the coincidence detection circuit includes a counter circuit that has a maximum count number set to be equal to the number of bits of the single information element contained in the information signal and that performs counting in sync with the OR signal delayed by the first delay circuit to output bit data representing the counted value in parallel and a AND circuit that outputs, as the coincidence detection signal, a AND signal of the bit data output in parallel from the counter circuit.

The first and the second pulse generation circuits and the coincidence detection circuit are formed by using versatile circuits such as the delay circuit, the exclusive OR circuit, the counter circuit, and the AND circuit. This can further contribute to cost reduction, improvement of designing work efficiency, and design period reduction in the reception device.

In the communication system of the first aspect, preferably, the transmission device includes a wireless transmission unit that wirelessly transmits the information signal and the information decryption signal, and the reception device includes a wireless reception unit that receives the information signal and the information decryption signal wirelessly transmitted.

The communication system structured as above can improve security in the transmission of an information signal through wireless communication as well as wired communication.

A transmission device according to a third aspect of the invention includes a transmission unit that transmits an information signal having information defined as a binary state value and an information decryption signal; and a signal generation unit that generates the information decryption signal, in which the state value of the information decryption signal is unchanged when the state value of the information signal is changed, whereas the state value of the information decryption signal is changed when the state value of the information signal is unchanged.

The transmission device of the third aspect can prevent information leaks, thereby enabling improvement of security in the transmission of an information signal such as a data signal.

A transmission device according to a fourth aspect of the invention includes a transmission unit that transmits a plurality of information signals each having information defined as a binary state value and an information decryption signal, and a signal generation unit that generates the information decryption signal, in which the state value of the information decryption signal is changed when the state values of the information signals are unchanged at the same timing.

Employing the structure as described above can prevent information leaks when the transmission device transmits a plurality of information signals. As a result, security can be improved in the transmission of the information signals.

In the transmission device according to the third aspect, preferably, the transmission unit includes a wireless transmission unit that wirelessly transmits the information signal and the information decryption signal.

Thereby, security can be improved when transmitting an information signal through wireless communication as well as wired communication.

A reception device according to a fifth aspect of the invention includes a reception unit that receives an information signal having information defined as a binary state value and an information decryption signal, and an information acquisition unit that acquires the state value of the information signal based on a changing timing of the state value of the information decryption signal, wherein the state value of the information decryption signal is unchanged when the state value of the information signal is changed, whereas the state value of the information decryption signal is changed when the state value of the information signal is unchanged.

In the reception device above, information leaks can be prevented and security can be improved when transmitting an information signal such as a data signal.

A reception device according to a sixth aspect of the invention includes a reception unit that receives a plurality of information signals each having information defined as a binary state value and an information decryption signal; and an information acquisition unit that acquires the state value of each of the information signals based on a changing timing of the state value of each of the information signals and the information decryption signal, wherein the state value of the information decryption signal is changed when the state values of the information signals are unchanged at the same timing.

Employing the reception device structured as above can prevent information leaks when a transmission device transmits a plurality of information signals. As a result, security can be improved in the transmission of the information signals.

In the reception device of the fifth aspect, preferably, the information acquisition unit includes a first pulse generation circuit that generates a first pulse signal in sync with the change of the state value of the information signal, a second pulse generation circuit that generates a second pulse signal in sync with the change of the state value of the information decryption signal, a OR circuit that outputs a OR signal of the first and the second pulse signals, a first delay circuit that delays the OR signal by a predetermined time, a coincidence detection circuit that counts a value in sync with the OR signal delayed by the first delay circuit to output a coincidence detection signal when the counted value is coincident with the number of bits of a single information element contained in the information signal, a serial-to-parallel conversion circuit that receives the information signal and the OR signal delayed by the first delay circuit to perform a serial-to-parallel conversion of the information signal in sync with the OR signal, and a signal processing circuit that acquires the serial-to-parallel converted information signal in sync with the coincidence detection signal.

The reception device structured as above can acquire (decode) an information signal in a simple circuit structure. This enables cost reduction, improvement of designing work efficiency, and design period reduction in the reception device.

Additionally, in the reception device according to the sixth aspect in which the transmission device transmits the plurality of information signals, preferably, the information acquisition unit includes a plurality of first pulse generation circuits that are provided to correspond to each of the information signals and that each generate a first pulse signal in sync with the change of the state value of each corresponding information signal, a second pulse generation circuit that generates a second pulse signal in sync with the change of the state value of the information decryption signal, a OR circuit that outputs a OR signal of the first pulse signal corresponding to the each information signal and the second pulse signal, a first delay circuit that delays the OR signal by a predetermined time, a coincidence detection circuit that counts a value in sync with the OR signal delayed by the first delay circuit to output a coincidence detection signal when the counted value is coincident with the number of bits of a single information element contained in each of the information signals, a plurality of serial-to-parallel conversion circuits that are provided to correspond to each of the information signals and that each receive the each corresponding information signal and the OR signal delayed by the first delay circuit to perform a serial-to-parallel conversion of the each corresponding information signal in sync with the OR signal, and a signal processing circuit that acquires each of the serial-to-parallel converted information signals in sync with the coincidence detection signal.

Employing the reception device structured as above can improve security in the transmission of the information signals by the transmission device, as well as enables cost reduction, improvement of designing work efficiency, and design period reduction in the reception device.

Additionally, in the reception device according to the fifth aspect, preferably, the first pulse generation circuit includes a second delay circuit that delays the information signal by a predetermined time and a first exclusive OR circuit that outputs, as the first pulse signal, an exclusive OR signal of the information signal and the information signal delayed by the second delay circuit; the second pulse generation circuit includes a third delay circuit that delays the information decryption signal by a predetermined time and a second exclusive OR circuit that outputs, as the second pulse signal, an exclusive OR signal of the information decryption signal and the information decryption signal delayed by the third delay circuit; and the coincidence detection circuit includes a counter circuit that has a maximum count number set to be equal to the number of bits of the single information element contained in the information signal and that performs counting in sync with the OR signal delayed by the first delay circuit to output bit data representing the counted value in parallel and a AND circuit that outputs, as the coincidence detection signal, the AND signal of the bit data output in parallel from the counter circuit.

As described above, the first and the second pulse generation circuits and the coincidence detection circuit are formed by using versatile circuits such as the delay circuit, the exclusive OR circuit, the counter circuit, and the AND circuit. This can further contribute to cost reduction, improvement of designing work efficiency, and design period reduction in the reception device.

Additionally, in the reception device according to the fifth aspect, preferably, the reception unit includes a wireless reception unit that receives the information signal and the information decryption signal wirelessly transmitted.

In the reception device structured as above, security can be improved when transmitting information signals through wireless communication as well as wired communication.

A communication scheme according to a seventh aspect of the invention includes transmitting an information signal having information defined as a binary state value and an information decryption signal from a transmission device; receiving the information signal and the information decryption signal by a reception device; and acquiring the state value of the information signal by the reception device based on a changing timing of the state value of each of the information signal and the information decryption signal, wherein the state value of the information decryption signal is unchanged when the state value of the information signal is changed, whereas the state value of the information decryption signal is changed when the state value of the information signal is unchanged.

In the above communication scheme, information leaks can be prevented and security can be improved when transmitting the information signal such as a data signal.

A semiconductor element including a transmission function according to an eighth aspect of the invention includes an information signal generation circuit that generates an information signal having information defined as a binary state value, an information decryption signal generation circuit that generates an information decryption signal, and a transmission circuit that outputs the information signal and the information decryption signal, wherein the information decryption signal generation circuit allows the state value of the information decryption signal to be unchanged when the state value of the information signal is changed, and allows the state value of the information decryption signal to be changed when the state value of the information signal is unchanged.

Using the semiconductor element having the transmission function described as above enables formation of the foregoing transmission device.

A semiconductor element including a reception function according to a ninth aspect of the invention includes a first pulse generation circuit that receives an information signal having information defined as a binary state value and an information decryption signal to generate a first pulse signal in sync with a change of the state value of the information signal; a second pulse generation circuit that generates a second pulse signal in sync with a change of the state value of the information decryption signal; a OR circuit that outputs a OR signal of the first and the second pulse signals; a first delay circuit that delays the OR signal by a predetermined time; a coincidence detection circuit that counts a value in sync with the OR signal delayed by the first delay circuit to output a coincidence detection signal when the counted value is coincident with the number of bits of a single information element contained in the information signal; a serial-to-parallel conversion circuit that receives the information signal and the OR signal delayed by the first delay circuit to perform a serial-to-parallel conversion of the information signal in sync with the OR signal; and a signal processing circuit that acquires the serial-to-parallel converted information signal in sync with the coincidence detection signal.

Using the semiconductor element having the reception function described as above enables formation of the foregoing reception device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanied drawings. A description will be given below of an example of a communication system according to an embodiment of the invention, which is applied to communication between circuit blocks in an electronic circuit, namely, wired communication.

Figure 1:
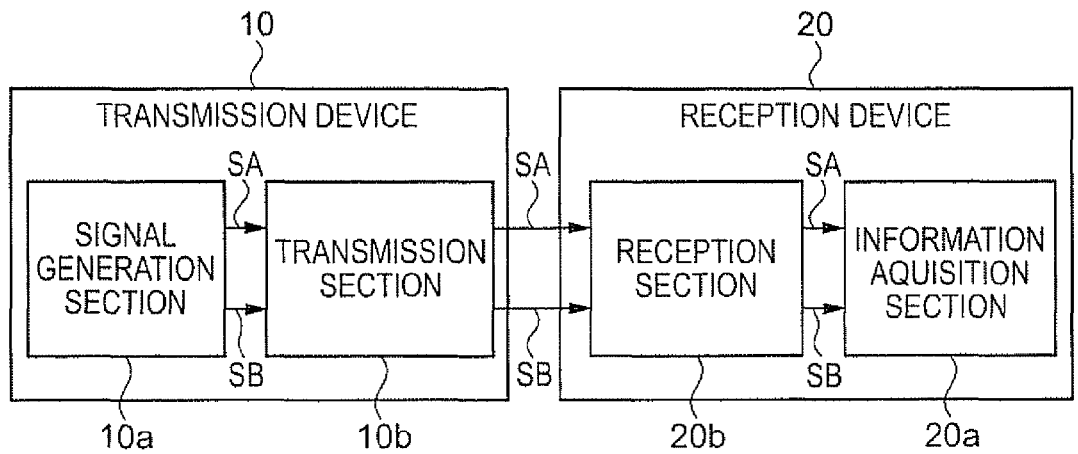
FIG. 1 is a structural block diagram of a communication system according to an embodiment of the invention.

FIG. 1 is a structural block diagram of the communication system according to the embodiment. As shown in FIG. 1, the communication system includes a transmission device 10 and a reception device 20. The transmission device 10 and the reception device 20, respectively, represent a transmission block and a reception block, respectively, in the electronic circuit, and may include a central processing unit (CPU), a microprocessor, and other circuits. Both devices 10 and 20 are connected to each other via two signal lines. As constituent elements of the devices, the transmission device 10 includes a signal generation section (a signal generation unit) 10a and a transmission section (a transmission unit) 10b, and the reception device 20 includes an information acquisition section (an information acquisition unit) 20a and a reception section (a reception unit) 20b.

In the transmission device 10, the signal generation section 10a generates an information signal SA and an information decryption signal SB, in which information of the signal is defined as a binary state value (a high level "1", or a low level "0"). When the state value of the information signal SA is changed, the state value of the information decryption signal SB is not changed. Conversely, when the state value of the information signal SA is unchanged, the state value of the information decryption signal SB is changed. The transmission section 10b transmits each of the information signal SA and the information decryption signal SB to the reception device 20 (specifically, to the reception section 20b) via each of the signal lines. In this case, the information signal SA is serial data and may include information such as a data body (e.g. a payload) or communication control information such as a header. Alternatively, the information signal SA may include a combination of the data body and the control information.

In the reception device 20, the reception section 20b receives the information signal SA and the information decryption signal SB from the transmission device 10 to output to the information acquisition section 20a. The information acquisition section 20a acquires a state value of the information signal SA (namely, information contained in the information signal SA) based on a changing timing of the state value of each of the signals SA and SB. Next, a detailed description will be given of the information acquisition section 20a with reference to FIG. 2.

Figure 2:
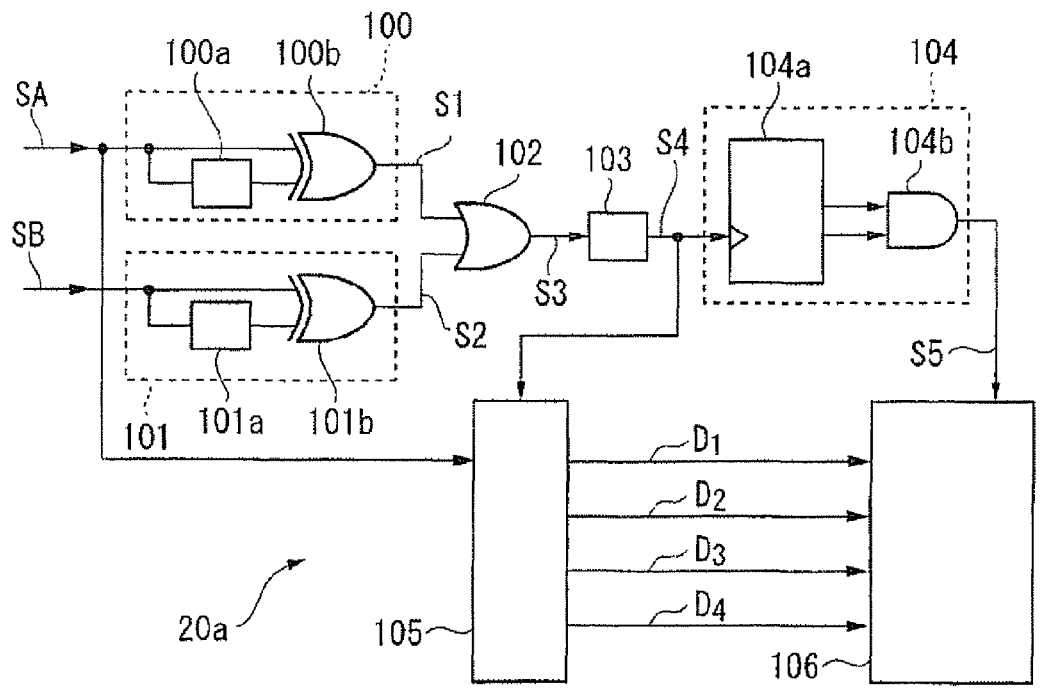
FIG. 2 is a block diagram of an internal structure of an information acquisition section 20a included in the communication system according to the embodiment.

FIG. 2 is a block diagram of an internal structure of the information acquisition section 20a. As shown in the drawing, the information acquisition section 20a includes a first pulse generation circuit 100, a second pulse generation circuit 101, a OR circuit 102, a delay circuit 103, a coincidence detection circuit 104, a shift register 105, and a controller 106.

The first pulse generation circuit 100 includes a delay circuit 100a and an exclusive OR circuit 100b. The delay circuit 10a receives the information signal SA to delay the signal by a predetermined time before outputting to the exclusive OR circuit 100b. The exclusive OR circuit 100b receives the information signal SA and the information signal SA delayed by the delay circuit 100a to output, as a first pulse signal S1, an exclusive OR signal of both signals to the OR circuit 104. That is, the first pulse generation circuit 100 including the delay circuit 100a and the exclusive OR circuit 100b outputs the first pulse signal S1 having a pulse width equivalent to a delay time of the delay circuit 100a in sync with a change of the state value of the information signal SA. The delay circuit 100a and the exclusive OR circuit 100b, respectively, are constituent elements equivalent to a second delay circuit and a first exclusive OR circuit, respectively, in the present embodiment.

The second pulse generation circuit 101 includes a delay circuit 101a and an exclusive OR circuit 101b. The delay circuit 101a receives the information decryption signal SB to delay the signal SB by a predetermined time before outputting to the exclusive OR circuit 101b. The exclusive OR circuit 101b receives the information decryption signal SB and the information decryption signal SB delayed by the delay circuit 101a to output, as a second pulse signal S2, an exclusive OR signal of both signals to the OR circuit 104. That is, the second pulse generation circuit 101 including the delay circuit 101a and the exclusive OR circuit 101b outputs the second pulse signal S2 having a pulse width equivalent to a delay time of the delay circuit 101a in sync with a change of the state value of the information decryption signal SB. The delay circuit 101a and the exclusive OR circuit 101b, respectively, are constituent elements equivalent to a third delay circuit and a second exclusive OR circuit, respectively, in the present embodiment.

The OR circuit 102 outputs a OR signal S3 of the first and the second pulse signals S1 and S2 to the delay circuit 103. The delay circuit 103 delays the OR signal S3 by a predetermined time to output as a delay pulse signal S4 to the coincidence detection circuit 104 and the shift register 105. The delay circuit 103 is a constituent element equivalent to a first delay circuit in the present embodiment.

The coincidence detection circuit 104 includes a counter circuit 104a and a AND circuit 104b. The counter circuit 104a has a maximum count number set to be equal to the number of bits of a single information element contained in the information signal SA and counts a value in sync with the delay pulse signal S4 to output bit data representing the counted value in parallel. In the present embodiment, the number of bits of the single information element contained in the information signal SA is assumed to be 4 and thus the maximum count number of the counter circuit 104a is assumed to be "4". In other words, the counter circuit 104a can count "0" to "3" and outputs 2-bit data patterns representing "0" (bit data: 00) to "3", (bit data: 11) in parallel to the AND circuit 104b. After counting up to the maximum count number "3", the counter circuit 104a, automatically, restarts counting from "0". As a coincidence detection signal S5, the AND circuit 104b outputs a AND signal of the 2-bit data output in parallel from the counter circuit 104a, to the controller 106. That is, the AND circuit 104b outputs the coincidence detection signal S5 of high level when the 2-bit data output in parallel from the counter circuit 104a represents "3". As described above, the coincidence detection circuit 104 performs counting in sync with the delay pulse signal S4 to output the coincidence detection signal S5 of the high level when the counted value is coincident with the number of bits (4 bits) of the single information element contained in the information signal SA.

The shift register 105 is a serial-to-parallel conversion circuit that receives the information signal SA and the delay pulse signal S4 to perform a serial-to-parallel conversion of the information signal SA in sync with the delay pulse signal S4. That is, when the number of bits of the single information element contained in the information signal SA is assumed to be 4, the shift register 105 converts the information signal SA as the serial data in parallel into first-bit data $D_1$, second-bit data $D_2$, third-bit data $D_3$, and fourth-bit data $D_4$ to output the data $D_1$ to $D_4$ to the controller 106. Then, in sync with the coincidence detection signal S5, the controller 106 acquires the information signal SA subjected to the serial-to-parallel conversion (namely, the bit data $D_1$ to $D_4$) to perform a predetermined signal processing by using the bit data $D_1$ to $D_4$. In the present embodiment, the shift register 105 is a constituent element equivalent to the serial-to-parallel conversion circuit and the controller 106 is a constituent element equivalent to a signal processing circuit.

In the above exemplification, the transmission device 10 and the reception device 20, respectively, are constituted by a positive logic circuit (where the high level represents an active state). Alternatively, the devices 10 and 20, respectively, may be constituted by a negative logic circuit.

Figure 3:
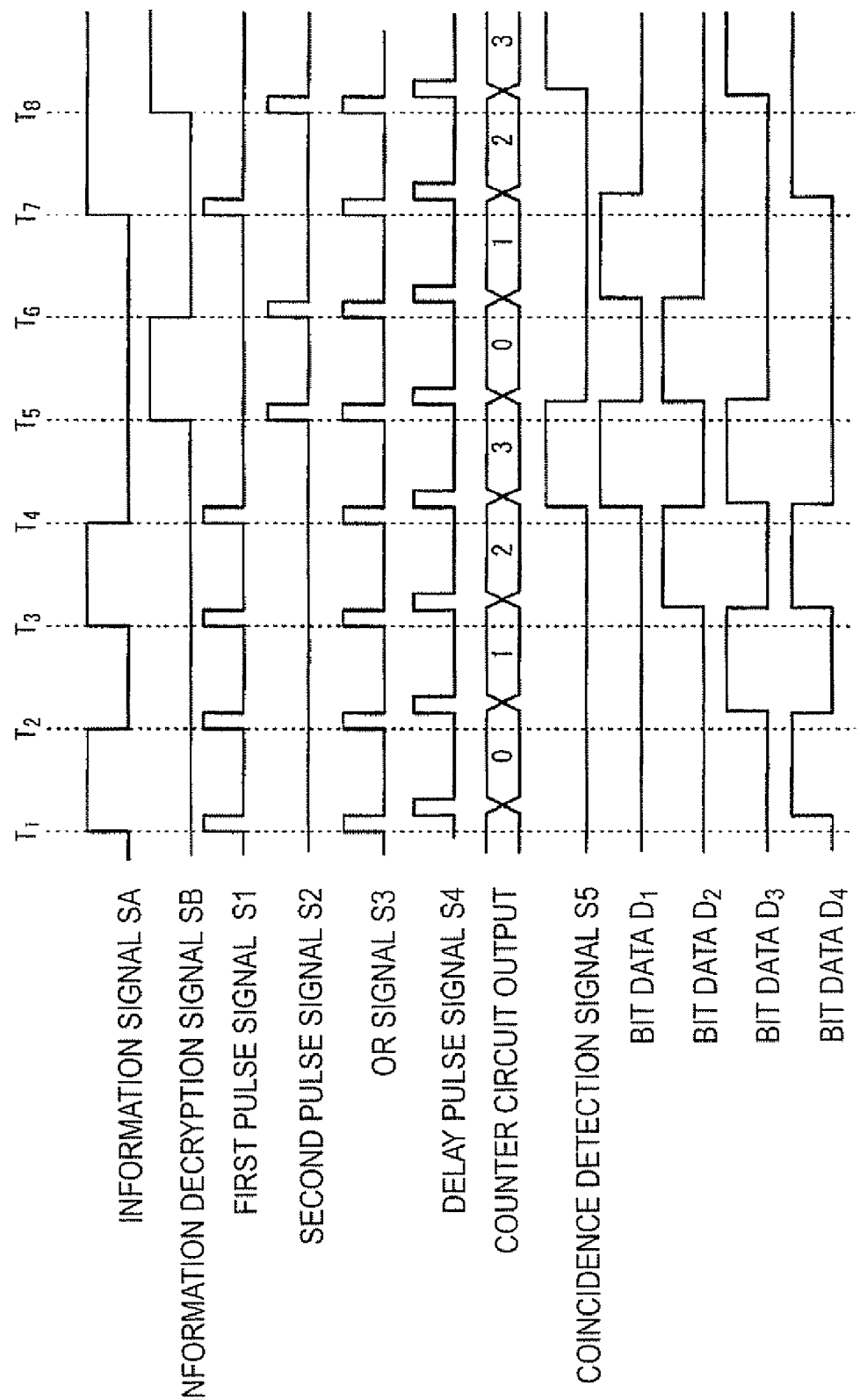
FIG. 3 is a timing chart showing an operation of the communication system.

Next will be described an operation of the communication system according to the present embodiment structured as above, by referring to a timing chart shown in FIG. 3. In the description below, it is assumed that the signal generation section 10a of the transmission device 10 generates and outputs 4-bit data "1010" and "0011" as the information signal SA. In an initial state, the information signal SA and the information decryption signal SB are assumed to be at a low level.

First, at time $T_1$, the signal generation section 10a of the transmission device 10 sets the information signal SA to the high level ("1") to output via the transmission section 10b. In this situation, since the state value of the information signal SA is changed from the value in the previous state (the initial state), the signal generation section 10a generates the information decryption signal SB having an unchanged state value (namely, the information decryption signal SB of the low level) to transmit via the transmission section 10b. In this manner, at time $T_1$, the state value of the information signal SA is changed from the low level to the high level. Accordingly, in sync with the change of the state value of the information signal SA, the first pulse generation circuit 100 of the information acquisition section 20a of the reception device 20 outputs the first pulse signal S1 of the high level to the OR circuit 102. Meanwhile, since the state value of the information decryption signal SB is maintained at the low level and unchanged, the second pulse generation circuit 101 outputs the second pulse signal S2 of the low level to the OR circuit 102.

The OR circuit 102 receives the high-level first pulse signal S1 and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output 2-bit data representing "0" (namely, "00") in parallel to the AND circuit 104b. That is, at this point in time, since the counted value is not coincident with the bit number "4" of the single information element contained in the information signal SA, the AND circuit 104b outputs the coincidence detection signal S5 of low level to the controller 106.

The shift register 105 sequentially shifts the information signal SA in sync with the delay pulse signal S5, where the bit data $D_4$ is set to the high level and the bit data $D_3$ to $D_1$ are set to the low level. Meanwhile, the controller 106, which receives the low-level coincidence detection signal S5, does not acquire the bit data $D_1$ to $D_4$ output from the shift register 105.

Next, at time $T_2$, the signal generation section 10a of the transmission device 10 sets the information signal SA to the low level ("0") to transmit via the transmission section 10b. In this situation, since the state value of the information signal SA is changed from the previous state value, the signal generation section 10a generates the information decryption signal SB having the unchanged state value (namely, the information decryption signal SB of the low level) to transmit via the transmission section 10b. As described above, at time T), the state value of the information signal SA is changed from the high level to the low level. Accordingly, in sync with the change of the state value of the information signal SA, the first pulse generation circuit 100 of the information acquisition section 20a of the reception device 20 outputs the first pulse signal S1 of the high level to the OR circuit 102. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signal S1 and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output 2-bit data representing "1" (namely, "01") in parallel to the AND circuit 104b. That is, at this point in time, since the counted value is not coincident with the bit number "4" of the single information element contained in the information signal SA, the AND circuit 104b outputs the coincidence detection signal S5 of low level to the controller 106.

The shift register 105 sequentially shifts the information signal SA in sync with the delay pulse signal S5, whereby the bit data $D_4$, $D_2$ and $D_1$ are set to the low level and the bit data $D_3$ is set to the high level. Meanwhile, the controller 106, which receives the low-level coincidence detection signal S5, does not acquire the bit data $D_1$ to $D_4$ output from the shift register 105.

Next, at time $T_3$, the signal generation section 10a of the transmission device 10 sets the information signal SA to the high level ("1") to transmit via the transmission section 10b. In this situation, since the state value of the information signal SA is changed from the previous state value, the signal generation section 10a generates the information decryption signal SB having the unchanged state value (namely, the low-level information decryption signal SB) to transmit via the transmission section 10b. As described above, at time $T_3$, the state value of the information signal SA is changed from the low level to the high level. Accordingly, in sync with the change of the state value of the information signal SA, the first pulse generation circuit 100 of the information acquisition section 20a of the reception device 20 outputs the first pulse signal S1 of the high level to the OR circuit 102. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signal S1 and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output 2-bit data representing "2" (namely, "10") in parallel to the AND circuit 104b. That is, at this point in time, since the counted value is not coincident with the bit number "4" of the single information element contained in the information signal SA, the AND circuit 104b outputs the low-level coincidence detection signal S5 to the controller 106.

The shift register 105 sequentially shifts the information signal SA in sync with the delay pulse signal S5, where the bit data $D_4$ and $D_2$ are set to the high level and the bit data $D_3$ and $D_1$ are set to the low level. Meanwhile, the controller 106, which receives the low-level coincidence detection signal S5, does not acquire the bit data $D_1$ to $D_4$ output from the shift register 105.

Next, at time $T_4$, the signal generation section 10a of the transmission device 10 sets the information signal SA to the low level ("0") to transmit via the transmission section 10b. In this situation, since the state value of the information signal SA is changed from the previous state value, the signal generation section 10a generates the information decryption signal SB having the unchanged state value (namely, the low-level information decryption signal SB) to transmit via the transmission section 10b. As described above, at time $T_4$, the state value of the information signal SA is changed from the high level to the low level. Thus, in sync with the change of the state value of the information signal SA, the first pulse generation circuit 100 of the information acquisition section 20a of the reception device 20 outputs the first pulse signal S1 of the high level to the OR circuit 102. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signal S1 and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output 2-bit data representing "3" (namely, "11") in parallel to the AND circuit 104b. That is, at this point in time, since the counted value is coincident with the bit number "4" of the single information element contained in the information signal SA, the AND circuit 104b outputs the coincidence detection signal S5 of the high level to the controller 106.

The shift register 105 sequentially shifts the information signal SA in sync with the delay pulse signal S5, where the bit data $D_4$ and $D_2$ are set to the low level and the bit data $D_3$ and $D_1$ are set to the high level. Meanwhile, the controller 106, which receives the high-level coincidence detection signal S5, acquires the bit data $D_1$ to $D_4$ output from the shift register 105. In other words, the controller 106 acquires the 4-bit data "1010" of the single information element contained in the information signal SA.

Next, at time $T_5$, to transmit the 4-bit data "0011" of the next single information element, the signal generation section 10a of the transmission device 10 sets the information signal SA to the low level ("0") to transmit via the transmission section 10b. In this situation, since the state value of the information signal SA is not changed from the previous state value, the signal generation section 10a generates the information decryption signal SB having a changed state value (namely, the information decryption signal SB of high level) to transmit via the transmission section 10b. In this manner, at time $T_5$, since the state value of the information signal SA is maintained at the low level, the first pulse generation circuit 100 of the information acquisition section 20a of the reception device 20 outputs the first pulse signal S1 of low level to the OR circuit 102. Meanwhile, the state value of the information decryption signal SB is changed from the low level to the high level. Accordingly, in sync with the change of the state value of the information decryption signal SB, the second pulse generation circuit 101 outputs the second pulse signal S2 of high level to the OR circuit 102.

The OR circuit 102 receives the low-level first pulse signal S1 and the high-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output the 2-bit data representing "0" (namely, "00") in parallel to the AND circuit 104b. That is, at this point in time, since the counted value is not coincident with the bit number "4" of the single information element contained in the information signal SA, the AND circuit 104b outputs the coincidence detection signal S5 of the low level to the controller 106.

The shift register 105 sequentially shifts the information signal SA in sync with the delay pulse signal S5, where the bit data $D_4$, $D_3$, and $D_1$ are set to the low level and the bit data $D_2$ is set to the high level. Meanwhile, since the controller 106, which receives the low-level coincidence detection signal S5, does not acquire the bit data $D_1$ to $D_4$ output from the shift register 105.

Next, at time TG, the signal generation section 10a of the transmission device 10 sets the information signal SA to the low level ("0") to transmit via the transmission section 10b. In this situation, since the state value of the information signal SA is not changed from the previous state value, the signal generation section 10a transmits the information decryption signal SB having the changed state value (namely, the low-level information decryption signal SB) via the transmission section 10b. As above, at time $T_6$, the state value of the information signal SA is maintained at the low level. Thus, the first pulse generation circuit 100 of the information acquisition section 20a of the reception device 20 outputs the first pulse signal S1 of the low level to the OR circuit 102. Meanwhile, since the information decryption signal SB is changed from the high level to the low level, the second pulse generation circuit 101 outputs the second pulse signal S2 of the high level to the OR circuit 102 in sync with the change of the state value of the information decryption signal SB.

The OR circuit 102 receives the low-level first pulse signal S1 and the high-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output the 2-bit data representing "1" (namely, "01") in parallel to the AND circuit 104b. That is, at this point in time, since the counted value is not coincident with the bit number "4" of the single information element contained in the information signal SA, the AND circuit 104b outputs the coincidence detection signal S5 of the low level to the controller 106.

The shift register 105 sequentially shifts the information signal SA in sync with the delay pulse signal S5, where the bit data $D_4$ to $D_2$ are set to the low level and the bit data $D_1$ is set to the high level. Meanwhile, the controller 106, which receives the low-level coincidence detection signal S5, does not acquire the bit data $D_1$ to $D_4$ output from the shift register 105.

Next, at time $T_7$, the signal generation section 10a of the transmission device 10 sets the information signal SA to the high level ("1") to transmit via the transmission section 10b. In this situation, since the state value of the information signal SA is changed from the previous state value, the signal generation section 10a generates the information decryption signal SB having the unchanged state value (namely, the low-level information decryption signal SB) to transmit via the transmission section 10b. As above, at time $T_7$, since the state value of the information signal SA is changed from the low level to the high level, the first pulse generation circuit 100 of the information acquisition section 20a of the reception device 20 outputs the first pulse signal S1 of the high level to the OR circuit 102 in sync with the change of the state value of the information signal SA. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signal S1 and the low-level second pulse signal S2 to output the OR signal S3 as a high-level pulse signal. The delay circuit 103 delays the high-level OR signal S3 by a predetermined time to output as the delay pulse signal 54 to the counter circuit 104a and the shift register 105. The counter circuit 104a counts a value in sync with the delay pulse signal S4 to output the 2-bit data representing "2" (namely, "10") in parallel to the AND circuit 104b. That is, at this point in time, since the counted value is not coincident with the bit number "4" of the single information element contained in the information signal SA, the AND circuit 104b outputs the coincidence detection signal S5 of the low level to the controller 106.

The shift register 105 sequentially shifts the information signal SA in sync with the delay pulse signal S5, where the bit data $D_4$ is set to the high level and the bit data $D_3$ to $D_1$ are set to the low level. Meanwhile, the controller 106, which receives the low-level coincidence detection signal S5, does not acquire the bit data $D_1$ to $D_4$ output from the shift register 105.

Next, at time $T_8$, the signal generation section 10a of the transmission device 10 sets the information signal SA to the high level ("1") to transmit via the transmission section 10b. In this situation, since the state value of the information signal SA is not changed from the previous state value, the signal generation section 10a transmits the information decryption signal SB having the changed state value (namely, the high-level information decryption signal SB) via the transmission section 10b. As above, at time $T_8$, the state value of the information signal SA is maintained at the high level. Thus, the first pulse generation circuit 100 of the information acquisition section 20a of the reception device 20 outputs the first pulse signal S1 of the low level to the OR circuit 102. Meanwhile, since the state value of the information decryption signal SB is changed from the high level to the low level, the second pulse generation circuit 101 outputs the second pulse signal S2 of the high level to the OR circuit 102 in sync with the change of the state value of the information decryption signal SB.

The OR circuit 102 receives the low-level first pulse signal S1 and the high-level second pulse signal S2 to output the OR signal S3 as a high-level pulse signal. The delay circuit 103 delays the high-level OR signal S3 by a predetermined time to output as the delay pulse signal S4 to the counter circuit 104a and the shift register 105. The counter circuit 104a counts a value in sync with the delay pulse signal S4 to output the 2-bit data representing "3" (namely, "11") in parallel to the AND circuit 104b. That is, at this point in time, since the counted value is coincident with the bit number "4" of the single information element contained in the information signal SA, the AND circuit 104b outputs the coincidence detection signal S5 of the high level to the controller 106.

The shift register 105 sequentially shifts the information signal SA in sync with the delay pulse signal S5, where the bit data $D_4$ and $D_3$ are set to the high level and the bit data $D_2$ and $D_1$ are set to the low level. Meanwhile, the controller 106, which receives the high-level coincidence detection signal S5, acquires the bit data $D_1$ to $D_4$ output from the shift register 105. In other words, the controller 106 acquires the 4-bit data "0011" of the single information element contained in the information signal SA. Thereafter, in accordance with the state value (the information) of the information signal, the same operation as above will be repeated.

As described above, in the communication system according to the embodiment, the transmission device 10 generates the information decryption signal SB, whose state value is unchanged when the state value of the information signal SA is changed and whose state value is changed when that of the information signal SA is unchanged. Then, the transmission device 10 transmits the information decryption signal SB and the information signal SA together to the reception device 20. The reception device 20 acquires the state value of the information signal SA based on the change timing of the state value of each of the information signal SA and the information decryption signal SB received. This makes it difficult to distinguish the information signal SA from the information decryption signal SB (namely, to determine which signal represents real information), as well as to discriminate between the roles of the signals SA and SB (namely, to identify protocols by which the signals are generated). Even if a third party can read both signals, the signals cannot be decoded, thereby preventing information leaks. This improves security in the transmission of an information signal such as a data signal.

The present invention is not restricted to the above embodiment. For example, modifications as below may be applied.

1. Transmission of a Plurality of Information Signals SA

Figure 4:
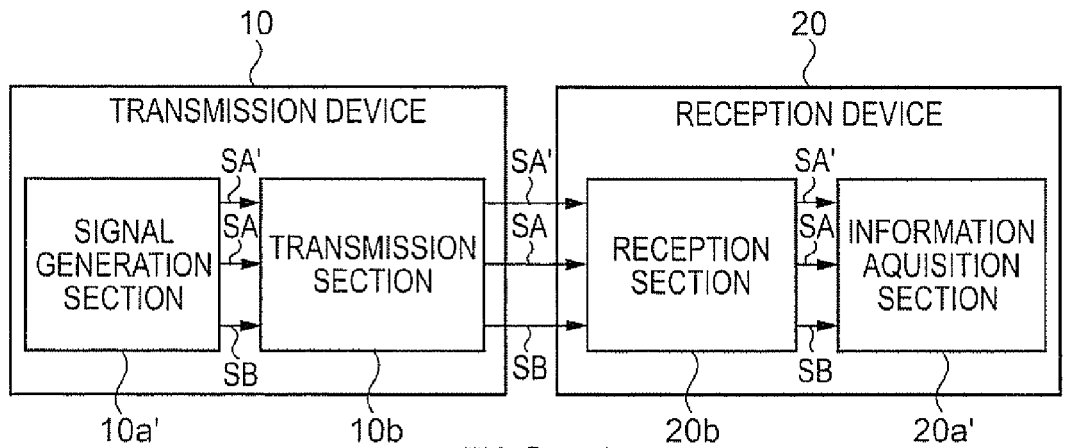
FIG. 4 is a structural block diagram illustrating the transmission of a plurality of information signals in a modified example of the communication system.

A description will be given of the transmission of a plurality of information signals SA. That is, as shown in FIG. 4, for example, two information signals SA and SA' are transmitted from the transmission device 10. In this case, a signal generation section 10a' generates the information decryption signal SB, whose state value is changed when the state values of the two information signals SA and SA' are not changed at the same timing. Meanwhile, an information acquisition section 20a' acquires the state values of the information signals SA and SA' based on a changing timing of the state value of each of the two information signals SA, SA' and the information decryption signal SB received. Hereinafter, a detailed description will be given of the transmission of the information signals SA and SA'.

Figure 5:
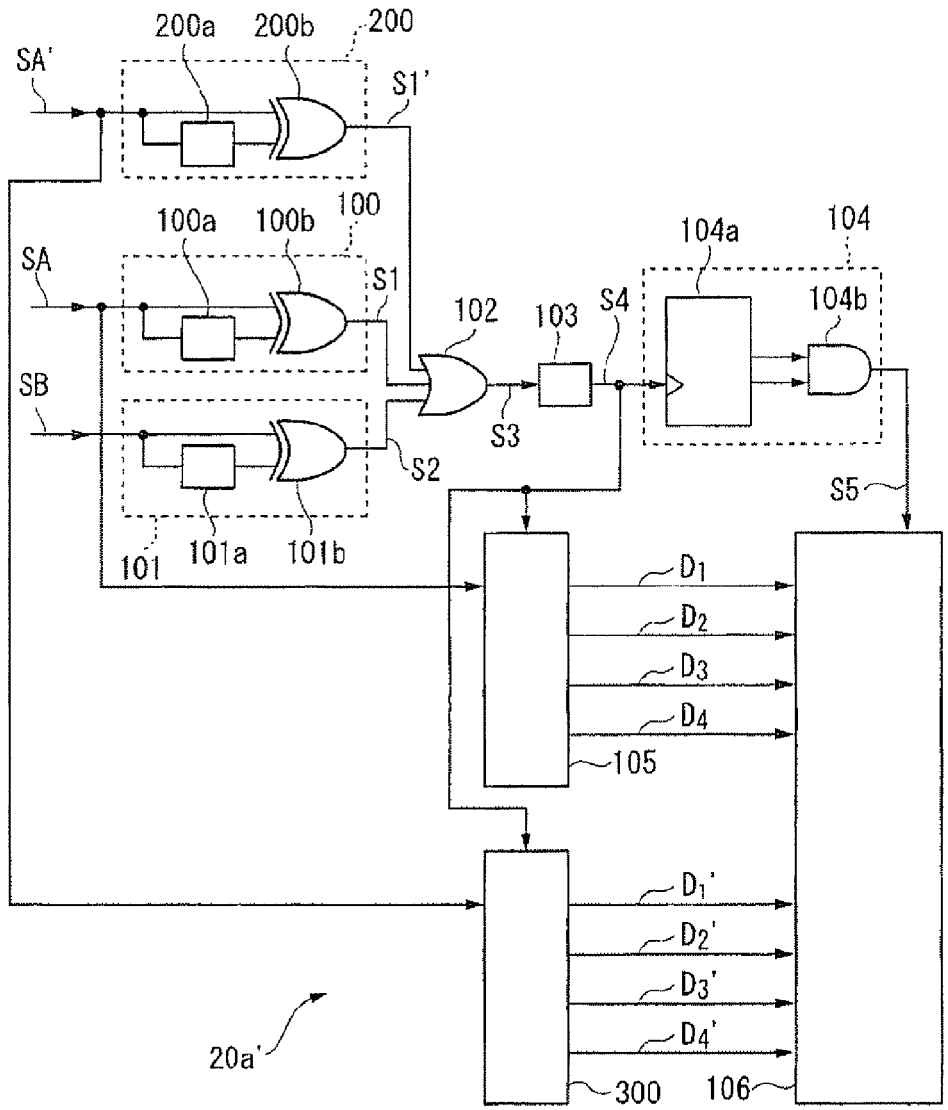
FIG. 5 is a block diagram of an internal structure of an information acquisition section 20a' used when transmitting the information signals.

FIG. 5 is a block diagram of an internal structure of the information acquisition section 20a' used when the information signals SA and SA' are transmitted. In FIG. 5, the same constituent elements as those in FIG. 2 are denoted by the same reference numerals and thus descriptions thereof will be omitted. The structure of the section 20a' in FIG. 5 is different from the structure thereof in FIG. 2 in that a first pulse generation circuit 200 and a shift register 300 are added so as to correspond to the information signal SA'. In other words, as in the first pulse generation circuit 100, the first pulse generation circuit 200 includes a delay circuit 200a and an exclusive OR circuit 200b, and outputs a first pulse signal S1' having a pulse width equivalent to a delay time of the delay circuit 200a to the OR circuit 102 in sync with a change of the state value of the information signal SA'.

Additionally, the shift register 300 is a serial-to-parallel conversion circuit that receives the information signal SA' and the delay pulse signal S4 to perform a serial-to-parallel conversion of the information signal SA' in sync with the delay pulse signal S4. In other words, when the number of bits of a single information element contained in the information signal SA' is assumed to be 4, the shift register 300 converts the information signal SA' as serial data in parallel into first-bit data $D_1$, second-bit data $D_2$, third-bit data $D_3$, and fourth-bit data $D_4$ to output them to the controller 106.

Figure 6:
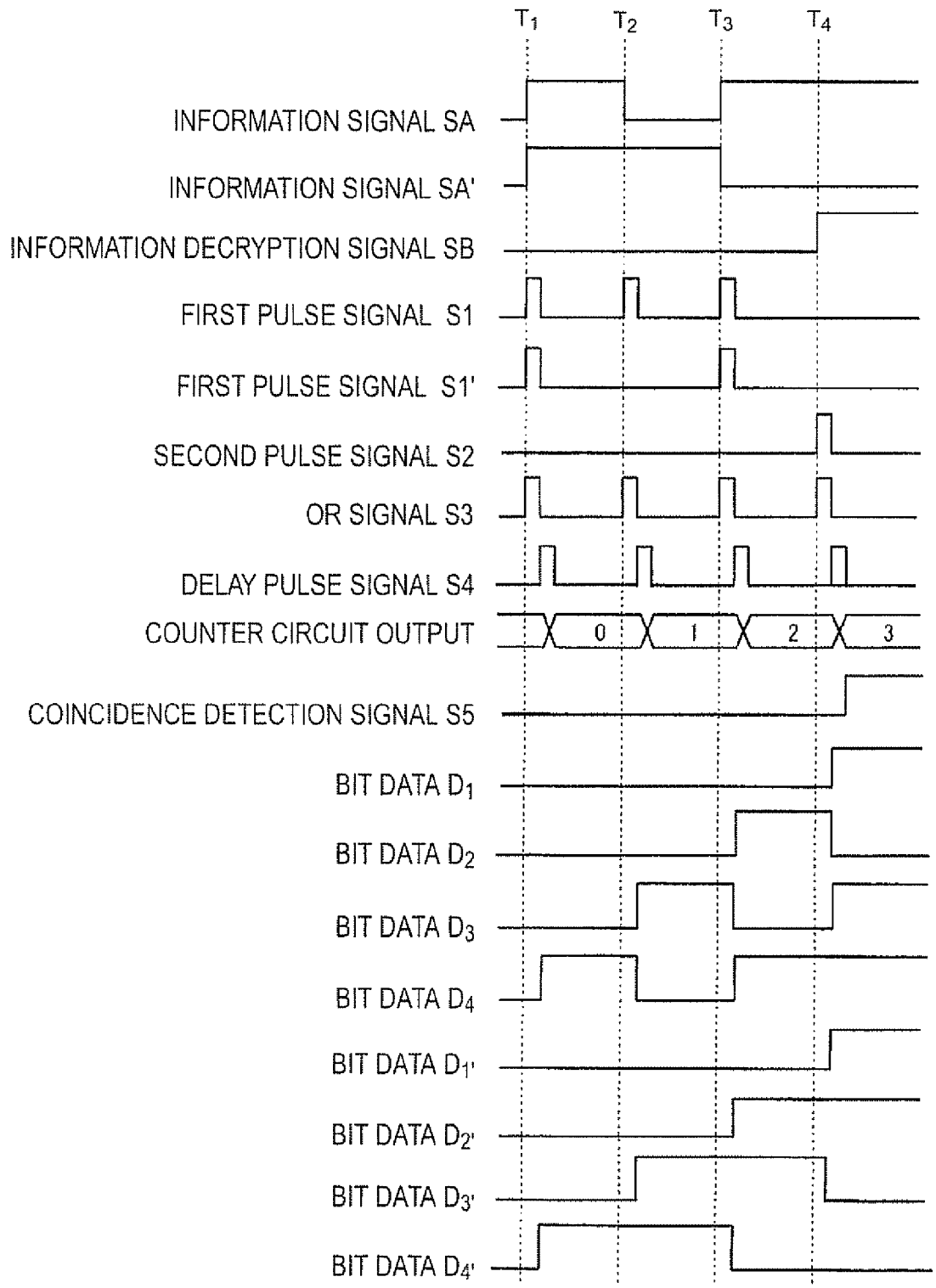
FIG. 6 is a timing chart showing an operation of the communication system in the transmission of the information signals.

FIG. 6 is a timing chart showing the operation of the communication system when the two information signals SA and SA' are transmitted. In the description below, it is assumed that the signal generation section 10a' of the transmission device 10 generates and transmits 4-bit data "1011" as the information signal SA and 4-bit data "1100" as the information signal SA'. In an initial state, the information signals SA, SA' and the information decryption signal SB are assumed to be at a low level.

First, at time $T_1$, the signal generation section 10a' of the transmission device 10 sets the information signals SA and SA' to the high level ("1") to output via the transmission section 10b. In this situation, since the state values of the information signals SA and SA' are changed from the previous state values (the initial state values), the signal generation section 10a' generates the information decryption signal SB having the unchanged state value (namely, the low-level information decryption signal SB) to transmit via the transmission section 10b. As described above, at time $T_1$, the state value of the information signal SA is changed from the low level to the high level. Accordingly, in sync with the change of the state value of the information signal SA, the first pulse generation circuit 100 of the information acquisition section 20a' of the reception device 20 outputs the first pulse signal S1 of the high level to the OR circuit 102. Additionally, in sync with the change of the state value of the information signal SA', also the first pulse generation circuit 200 outputs the first pulse signal S1' of the high level to the OR circuit 102. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signals S1, S1' and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift registers 105 and 300. The counter circuit 104a counts a value in sync with the delay pulse signal S4 to output the 2-bit data representing "0" (namely, "00") in parallel to the AND circuit 104b. That is, at this point in time, since the counted value is not coincident with the bit number "4" of the single information element contained in each of the information signals SA, SA', the AND circuit 104b outputs the coincidence detection signal S5 of the low level to the controller 106.

The shift register 105 sequentially shifts the information signal SA in sync with the delay pulse signal S5, where the bit data $D_4$ is set to the high level and the bit data $D_1$ to $D_3$ are set to the low level. Additionally, the shift register 300 sequentially shifts the information signal SA', where the bit data $D_4'$ is set to the high level and the bit data $D_1'$ to $D_3'$ are set to the low level. Meanwhile, the controller 106, which receives the low-level coincidence detection signal S5, does not acquire the bit data output from the shift registers 105 and 300.

Next, at time $T_2$, the signal generation section 10a' of the transmission device 10 sets the information signal SA to the low level ("0") and the information SA' to the high level ("1") to transmit them via the transmission section 10b. At that time, since the state value of the information signal SA is changed from the previous state value, the signal generation section 10a' transmits the information decryption signal SB having the unchanged state value (namely, the low-level information decryption signal SB) via the transmission section 10b. As described above, at time $T_2$, the state value of the information signal SA is changed from the high level to the low level. Thus, in sync with the change of the state value of the information signal SA, the first pulse generation circuit 100 of the information acquisition section 20a' outputs the first pulse signal S1 of the high level to the OR circuit 102. Additionally, since the state value of the information signal SA' is unchanged, the first pulse generation circuit 200 outputs the first pulse signal S1' of the low level to the OR circuit 102. Meanwhile, since the information decryption signal SB is maintained at the low level and unchanged, the second pulse generation circuit 101 outputs the second pulse signal S2 of the low level to the OR circuit 102.

The OR circuit 102 receives the high-level first pulse signal S1, the low-level first pulse signal S1', and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift registers 105, 300. The counter circuit 104a counts a value in sync with the delay pulse signal S4 to output the 2-bit data representing "1" (namely, "01") in parallel to the AND circuit 104b. That is, at this point in time, since the counted value is not coincident with the bit number "4" of the single information element contained in each of the information signals SA and SA', the AND circuit 104b outputs the coincidence detection signal S5 of the low level to the controller 106.

The shift register 105 sequentially shifts the information signal SA in sync with the delay pulse signal S5, where the bit data $D_4$, $D_2$ and $D_1$ are set to the low level and the bit data $D_3$ is set to the high level. The shift register 300 sequentially shifts the information signal SA' in sync with the delay pulse signal S5, where the bit data $D_4'$ and $D_3'$ are set to the high level and the bit data $D_2'$ and $D_1'$ are set to the low level. Meanwhile, the controller 106, which receives the low-level coincidence detection signal S5, does not acquire the bit data output from the shift registers 105 and 300.

Next, at time $T_3$, the signal generation section 10a' of the transmission device 10 sets the information signal SA to the high level ("1") and the information SA' to the low level ("0") to transmit the signals via the transmission section 10b. In this situation, since the state value of each of the information signals SA and SA' is changed from the previous state value, the signal generation section 10a' generates the information decryption signal SB having the unchanged state value (namely, the low-level information decryption signal SB) to transmit via the transmission section 10b. As above, at time $T_3$, the state value of the information signal SA is changed from the low level to the high level. Accordingly, in sync with the change of the state value of the information signal SA, the first pulse generation circuit 100 of the information acquisition section 20a' of the reception device 20 outputs the first pulse signal S1 of the high level to the OR circuit 102. Additionally, in sync with the change of the state value of the information signal SA', also the first pulse generation circuit 200 outputs the first pulse signal S1' of the high level to the OR circuit 102. Meanwhile, since the state value of the information decryption signal SB is maintained at the low level and unchanged, the second pulse generation circuit 101 outputs the second pulse signal S2 of the low level to the OR circuit 102.

The OR circuit 102 receives the high-level first pulse signals S1, S1' and the low-level second pulse signal S2 to output the OR signal S3 as a high-level pulse signal. The delay circuit 103 delays the high-level OR signal S3 by a predetermined time to output as the delay pulse signal S4 to the counter circuit 104a and the shift registers 105, 300. The counter circuit 104a counts a value in sync with the delay pulse signal S4 to output the 2-bit data representing "2" (namely, "10") in parallel to the AND circuit 104b. That is, at this point in time, since the counted value is not coincident with the bit number "4" of the single information element contained in each of the information signals SA and SA', the AND circuit 104b outputs the coincidence detection signal S5 of the low level to the controller 106.

The shift register 105 sequentially shifts the information signal SA in sync with the delay pulse signal S5, where the bit data $D_4$ and $D_2$ are set to the high level and the bit data $D_3$ and $D_1$ are set to the low level. The shift register 300 sequentially shifts the information signal SA' in sync with the delay pulse signal S5, where the bit data $D_4'$ and $D_1'$ are set to the low level and the bit data $D_3'$ and $D_2'$ are set to the high level. Meanwhile, the controller 106, which receives the low-level coincidence detection signal S5, does not acquire the bit data output from the shift registers 105 and 300.

Next, at time $T_4$, the signal generation section 10a' of the transmission device 10 sets the information signal SA to the high level ("1") and the information signal SA' to the low level ("0") to transmit the signals via the transmission section 10b. At that time, since the state value of each of the information signals SA and SA' is unchanged from the previous state value, the signal generation section 10a generates the information decryption signal SB having the changed state value (namely, the high-level information decryption signal SB) to transmit via the transmission section 10b. As above, at time $T_4$, the state value of the information signal SA is maintained at the high level. Thus, the first pulse generation circuit 100 of the information acquisition section 20a' of the reception device 20 outputs the first pulse signal S1 of the low level to the OR circuit 102. Additionally, since the state value of the information signal SA' is maintained at the low level, also the first pulse generation circuit 200 outputs the first pulse signal S1' of the low level to the OR circuit 102. Meanwhile, since the state value of the information decryption signal SB is changed from the low level to the high level, the second pulse generation circuit 101 outputs the second pulse signal S2 of the high level to the OR circuit 102 in sync with the information decryption signal SB.

The OR circuit 102 receives the low-level first pulse signal S1, S1' and the high-level second pulse signal S2 to output the OR signal S3 as a high-level pulse signal. The delay circuit 103 delays the high-level OR signal S3 by a predetermined time to output as the delay pulse signal S4 to the counter circuit 104a and the shift registers 105, 300. The counter circuit 104a counts a value in sync with the delay pulse signal S4 to output the 2-bit data representing "3" (namely, "11") in parallel to the AND circuit 104b. That is, at this point in time, since the counted value is coincident with the bit number "4" of the single information element contained in each of the information signals SA and SA', the AND circuit 104b outputs the coincidence detection signal S5 of the high level to the controller 106.

The shift register 105 sequentially shifts the information signal SA in sync with the delay pulse signal S5, where the bit data $D_4$, $D_2$ and $D_1$ are set to the high level and the bit data $D_3$ is set to the low level. Additionally, the shift register 300 sequentially shifts the information signal SA' in sync with the delay pulse signal S5, where the bit data $D_4'$ and $D_3'$ are set to the low level and the bit data $D_2'$ and $D_1'$ are set to the high level. Meanwhile, the controller 106, which receives the high-level coincidence detection signal S5, acquires the bit data output from the shift registers 105 and 300.

In other words, the controller 106 acquires the 4-bit data "1011" of the single information element contained in the information signal SA and the 4-bit data "1100" of the single information element contained in the information signal SA'.

As described above, in the transmission of the two information signals SA and SA', the transmission device transmits the information decryption signal SB having the changed state value when the state values of the signals SA and SA' are both unchanged at the same timing. Meanwhile, the reception device acquires the state values of the information signals SA and SA' based on the changing timing of the state value of each of the received signals SA, SA' and SB. Thereby, even when a plurality of information signals are transmitted as above, information leaks can be prevented, so that security can be improved in the communication system.

In the transmission of two or more information signals, it is only necessary to add a first pulse generation circuit and a shift register corresponding to each information signal. Similarly in this case, only a single information decryption signal is needed to transmit.

2. Application to Other Communication Systems

As an example of the communication system of the embodiment, the above description has been given of the communication between the circuit blocks in the electronic circuit. However, the invention can be applied to other communication systems. For example, the invention is applicable to a communication system in which a transmission device and a reception device are connected to each other via an internet protocol (IP) network, a local area network (LAN), or the like. In the system, generally, information signals are packetized and transmitted. Thus, the transmission device only needs to packetize and transmit each of the information signal and the information decryption signal, and the reception device only needs to perform the foregoing operation to acquire (decode) the information signal. To packetize and transmit each of the signals, the reception device needs to perform phase adjustment such that the information signal and the information decryption signal have the same phase before inputting them to the information acquisition section 20a.

Figure 7:
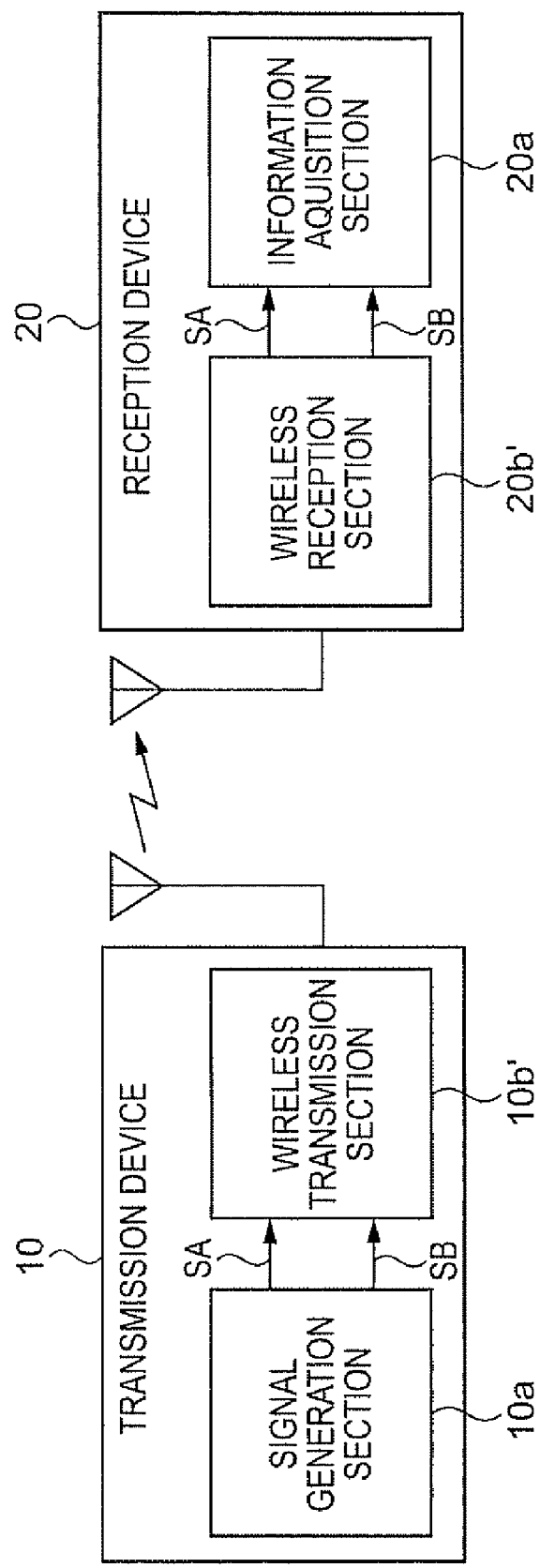
FIG. 7 is another modified example of the communication system.

Furthermore, in addition to wired communication systems, the invention can also be applied to wireless communication systems. When applied to any wireless communication system, as shown in FIG. 7, the transmission device 10 needs to include a wireless transmission section (a wireless transmission unit) 10b', and the reception device 20 needs to include a wireless reception section (a wireless reception unit) 20b'. The wireless transmission section 10b' receives the signals SA and SB from the signal generation section 10a to perform error-correction encoding, modulation, and frequency conversion into RF signals. Then, the section 10b' transmits the RF signals to the reception device 20 via a transmission antenna. The wireless reception section 20b' converts the RF signals received via a reception antenna into IF signals and performs demodulation, error-correction encoding, and the like to extract the information signal SA and the information decryption signal SB, and then outputs them to the information acquisition section 20a. Even in the wireless communication system, when the signals SA and SB are separately packetized and transmitted at different timings, the reception device needs to perform phase adjustment such that the signals have the same phase before inputting them to the information acquisition section 20a.

What is claimed is:

1. A communication system, comprising:
a transmission device that transmits an information signal having information defined as a binary state value, the transmission device including a signal generation unit that generates an information decryption signal to transmit the information decryption signal together with the information signal, wherein the state value of the information decryption signal is unchanged when the state value of the information signal is changed, whereas the state value of the information decryption signal is changed when the state value of the information signal is unchanged; and
a reception device that receives the information signal and the information decryption signal, the reception device including an information acquisition unit that acquires the state value of the information signal based on a changing timing of the state value of each of the information signal and the information decryption signal received,
wherein the information acquisition unit includes:
a first pulse generation circuit that generates a first pulse signal in sync with the change of the state value of the information signal;
a second pulse generation circuit that generates a second pulse signal in sync with the change of the state value of the information decryption signal;
a OR circuit that outputs a OR signal of the first and the second pulse signals, a first delay circuit that delays the OR signal by a predetermined time;
a coincidence detection circuit that counts a value in sync with the OR signal delayed by the first delay circuit to output a coincidence detection signal when the counted value is coincident with the number of bits of a single information element contained in the information signal;
a serial-to-parallel conversion circuit that receives the information signal and the OR signal delayed by the first delay circuit to perform a serial-to-parallel conversion of the information signal in sync with the OR signal; and
a signal processing circuit that acquires the serial-to-parallel converted information signal in sync with the coincidence detection signal.

2. The communication system according to claim 1, wherein the first pulse generation circuit includes a second delay circuit that delays the information signal by a predetermined time and a first exclusive OR circuit that outputs, as the first pulse signal, an exclusive OR signal of the information signal and the information signal delayed by the second delay circuit; the second pulse generation circuit includes a third delay circuit that delays the information decryption signal by a predetermined time and a second exclusive OR circuit that outputs, as the second pulse signal, an exclusive OR signal of the information decryption signal and the information decryption signal delayed by the third delay circuit; and the coincidence detection circuit includes a counter circuit that has a maximum count number set to be equal to the number of bits of the single information element contained in the information signal and that performs counting in sync with the OR signal delayed by the first delay circuit to output bit data representing the counted value in parallel and a AND circuit that outputs, as the coincidence detection signal, a AND signal of the bit data output in parallel from the counter circuit.

3. The communication system according to claim 1, wherein the transmission device includes a wireless transmission unit that wirelessly transmits the information signal and the information decryption signal, and the reception device includes a wireless reception unit that receives the information signal and the information decryption signal wirelessly transmitted.

4. A communication system, comprising:
a transmission device that transmits a plurality of information signals each having information defined as a binary state value, the transmission device including a signal generation unit that generates an information decryption signal to transmit the information decryption signal together with the information signals, wherein the state value of the information decryption signal is changed when the state values of the information signals are unchanged at the same timing; and
a reception device that receives the information signals and the information decryption signal, the reception device including an information acquisition unit that acquires each state value of the information signals based on a changing timing of the state value of each of the information signals and the information decryption signal received,
wherein the information acquisition unit includes:
a plurality of first pulse generation circuits that are provided to correspond to each of the information signals and that each generate a first pulse signal in sync with the change of the state value of each corresponding information signal;
a second pulse generation circuit that generates a second pulse signal in sync with the change of the state value of the information decryption signal;
a OR circuit that outputs a OR signal of the first pulse signal corresponding to each information signal and the second pulse signal;
a first delay circuit that delays the OR signal by a predetermined time;
a coincidence detection circuit that counts a value in sync with the OR signal delayed by the first delay circuit to output a coincidence detection signal when the counted value is coincident with the number of bits of a single information element contained in each of the information signals;
a plurality of serial-to-parallel conversion circuits that are provided to correspond to each of the information si nals and that each receive each corresponding information signal and the OR signal delayed by the first delay circuit to perform a serial-to-parallel conversion of the each corresponding information signal in sync with the OR signal; and
a signal processing circuit that acquires each of the serial-to-parallel converted information signals in sync with the coincidence detection signal.

5. A reception device, comprising:
a reception unit that receives an information signal having information defined as a binary state value and an information decryption signal; and
an information acquisition unit that acquires the state value of the information signal based on a changing timing of the state value of the information decryption signal, wherein the state value of the information decryption signal is unchanged when the state value of the information signal is changed, whereas the state value of the information decryption signal is changed when the state value of the information signal is unchanged, wherein the information acquisition unit includes:
- a first pulse generation circuit that generates a first pulse signal in sync with the change of the state value of the information signal;
- a second pulse generation circuit that generates a second pulse signal in sync with the change of the state value of the information decryption signal;
- a OR circuit that outputs a OR signal of the first and the second pulse signals, a first delay circuit that delays the OR signal by a predetermined time;
- a coincidence detection circuit that counts a value in sync with the OR signal delayed by the first delay circuit to output a coincidence detection signal when the counted value is coincident with the number of bits of a single information element contained in the information signal;
- a serial-to-parallel conversion circuit that receives the information signal and the OR signal delayed by the first delay circuit to perform a serial-to-parallel conversion of the information signal in sync with the OR signal; and
- a signal processing circuit that acquires the serial-to-parallel converted information signal in sync with the coincidence detection signal.

6. The reception device according to claim 5, wherein the first pulse generation circuit includes a second delay circuit that delays the information signal by a predetermined time and a first exclusive OR circuit that outputs, as the first pulse signal, an exclusive OR signal of the information signal and the information signal delayed by the second delay circuit; the second pulse generation circuit includes a third delay circuit that delays the information decryption signal by a predetermined time and a second exclusive OR circuit that outputs, as the second pulse signal, an exclusive OR signal of the information decryption signal and the information decryption signal delayed by the third delay circuit; and the coincidence detection circuit includes a counter circuit that has a maximum count number set to be equal to the number of bits of the single information element contained in the information signal and that performs counting in sync with the OR signal delayed by the first delay circuit to output bit data representing the counted value in parallel and a AND circuit that outputs, as the coincidence detection signal, the AND signal of the bit data output in parallel from the counter circuit.

7. The reception device according to claim 5, wherein the reception unit includes a wireless reception unit that receives the information signal and the information decryption signal wirelessly transmitted.

8. A reception device, comprising:
- a reception unit that receives a plurality of information signals each having information defined as a binary state value and an information decryption signal; and
- an information acquisition unit that acquires the state value of each of the information signals based on a changing timing of the state value of each of the information signals and the information decryption signal,
wherein the state value of the information decryption signal is changed when the state values of the information signals are unchanged at the same timing,
wherein the information acquisition unit includes:
- a plurality of first pulse generation circuits that are provided to correspond to each of the information signals and that each generate a first pulse signal in sync with the change of the state value of each corresponding information signal;
- a second pulse generation circuit that generates a second pulse signal in sync with the change of the state value of the information decryption signal;
- a OR circuit that outputs a OR signal of the first pulse signal corresponding to the each information signal and the second pulse signal;
- a first delay circuit that delays the OR signal by a predetermined time;
- a coincidence detection circuit that counts a value in sync with the OR signal delayed by the first delay circuit to output a coincidence detection signal when the counted value is coincident with the number of bits of a single information element contained in each of the information signals;
- a plurality of serial-to-parallel conversion circuits that are provided to correspond to each of the information signals and that each receive the each corresponding information signal and the OR signal delayed by the first delay circuit to perform a serial-to-parallel conversion of the each corresponding information signal in sync with the OR signal; and
- a signal processing circuit that acquires each of the serial-to-parallel converted information signals in sync with the coincidence detection signal.

9. A communication scheme, comprising:
transmitting an information signal having information defined as a binary state value and an information decryption signal from a transmission device;
receiving the information signal and the information decryption signal by a reception device having an information acquisition unit, wherein the information acquisition unit includes:
- a first pulse generation circuit that generates a first pulse signal in sync with the change of the state value of the information signal;
- a second pulse generation circuit that generates a second pulse signal in sync with the change of the state value of the information decryption signal;
- a OR circuit that outputs a OR signal of the first and the second pulse signals, a first delay circuit that delays the OR signal by a predetermined time;
- a coincidence detection circuit that counts a value in sync with the OR signal delayed by the first delay circuit to output a coincidence detection signal when the counted value is coincident with the number of bits of a single information element contained in the information signal;
- a serial-to-parallel conversion circuit that receives the information signal and the OR signal delayed by the first delay circuit to perform a serial-to-parallel conversion of the information signal in sync with the OR signal; and
- a signal processing circuit that acquires the serial-to-parallel converted information signal in sync with the coincidence detection signal; and acquiring the state value of the information signal by the reception device based on a changing timing of the state value of each of the information signal and the information decryption signal, wherein the state value of the information decryption signal is unchanged when the state value of the information signal is changed, whereas the state value of the information decryption signal is changed when the state value of the information signal is unchanged.

10. A semiconductor element including a reception function, comprising:
a first pulse generation circuit that receives an information signal having information defined as a binary state value and an information decryption signal to generate a first pulse signal in sync with a change of the state value of the information signal;
a second pulse generation circuit that generates a second pulse signal in sync with a change of the state value of the information decryption signal;
a OR circuit that outputs a OR signal of the first and the second pulse signals;
a first delay circuit that delays the OR signal by a predetermined time;
a coincidence detection circuit that counts a value in sync with the OR signal delayed by the first delay circuit to output a coincidence detection signal when the counted value is coincident with the number of bits of a single information element contained in the information signal;
a serial-to-parallel conversion circuit that receives the information signal and the OR signal delayed by the first delay circuit to perform a serial-to-parallel conversion of the information signal in sync with the OR signal; and
a signal processing circuit that acquires the serial-to-parallel converted information signal in sync with the coincidence detection signal.

* * * * *